(12) United States Patent
Rozental et al.

(10) Patent No.: US 9,407,477 B2
(45) Date of Patent: Aug. 2, 2016

(54) METHOD AND APPARATUS FOR CORRELATION CANCELLER FOR INTERFERENCE MITIGATION WITH ADAPTIVE DC OFFSET CANCELLATION

(71) Applicant: MOTOROLA SOLUTIONS, INC, Schaumburg (IL)

(72) Inventors: Mark Rozental, Gedera (IL); Nir Corse, Rishon le-Zion (IL); Kevin G. Corse, Elmhurst (IL); Josh E. Doberstein, Yad Benyamin (IL); Baruh Hason, Tel Aviv-Yaffo (IL); Claudine Tordjman, Holon (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/539,490

(22) Filed: Nov. 12, 2014

(65) Prior Publication Data

US 2016/0134444 A1  May 12, 2016

(51) Int. Cl.
*H04L 25/06* (2006.01)
*H04B 1/10* (2006.01)

(52) U.S. Cl.
CPC .............. *H04L 25/061* (2013.01); *H04B 1/10* (2013.01)

(58) Field of Classification Search
CPC ... H03F 3/24; H03F 1/3247; H03F 2200/336; H03F 2200/57; H03F 1/32; H03F 1/3294; H03F 1/34; H03F 2200/451; H03F 2200/168; H03F 2200/207; H03F 2200/408; H03F 2200/78; H03F 3/195; H03F 1/0205; H03F 1/0238
USPC ................................. 375/285, 296
See application file for complete search history.

(56) References Cited

U.S. PATENT DOCUMENTS

| 5,140,699 | A | 8/1992 | Kozak | |
|---|---|---|---|---|
| 5,444,864 | A | 8/1995 | Smith | |
| 5,628,059 | A * | 5/1997 | Kurisu | H03D 3/008 375/216 |
| 8,175,535 | B2 | 5/2012 | Mu | |
| 8,320,868 | B2 | 11/2012 | Pratt et al. | |
| 8,649,452 | B2 | 2/2014 | Horisaki et al. | |
| 2009/0167577 | A1* | 7/2009 | Juang | H03F 3/45475 341/120 |
| 2009/0227214 | A1* | 9/2009 | Georgantas | H04B 1/30 455/86 |
| 2010/0144303 | A1* | 6/2010 | Stogner | H04L 25/061 455/296 |

OTHER PUBLICATIONS

PCT international Search report dated Nov. 12, 2012 counterpart of PCT/US2013/069411.
F. J. Kub et al—"Self-Calibrating Hybrid Analog CMOS Co-Site Interference Canceller"—SFA, Inc / Xetron Cor.—IEEE 1999.

* cited by examiner

*Primary Examiner* — Sam K Ahn
*Assistant Examiner* — Janice Tieu
(74) *Attorney, Agent, or Firm* — Barbara R. Doutre; Lawrence A Baratta, Jr.

(57) ABSTRACT

A method and apparatus for a method and apparatus for correlation canceller for interference mitigation with adaptive DC offset cancellation for a dual mode communication device includes detecting an active signal transmitting in one mode; configuring integrators associated with the adaptive correlation canceller into gain amplifiers; detecting DC offset utilizing the gain amplifiers and comparators; and configuring the integrators from the gain amplifiers back to integrators with the DC offset applied thereto. The active signal transmitting in one mode can be Long Term Evolution (LTE) which is adjacent to a signal in another mode.

16 Claims, 11 Drawing Sheets

METHOD AND APPARATUS FOR CORRELATION CANCELLER FOR INTERFERENCE MITIGATION WITH ADAPTIVE DC OFFSET CANCELLATION

BACKGROUND OF THE INVENTION

In dual-band portable radios or mobile devices (referred to herein as portable devices), there can be interference due to spectrum allocation. Long Term Evolution (LTE) interference is a known technical challenge, specifically in the U.S., at 700 MHz. For example, portable devices with band 13 LTE and narrowband Public Safety (PS) transceivers can have the LTE transmitter interfere with the narrowband PS receiver. One conventional technique for mitigation can include filtering; however, this is not feasible in portable devices due to size, cost, and complexity. Another technique can include a correlation canceller (C2) that estimates the phase and amplitude of the LTE interferer and subtracts the interferer. While this works in theory for an ideal case, DC offsets in actual or practical implementations significantly limits the ability for mitigation with the correlation canceller.

Accordingly, there is a need for a method and apparatus for correlation canceller for interference mitigation with adaptive DC offset cancellation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
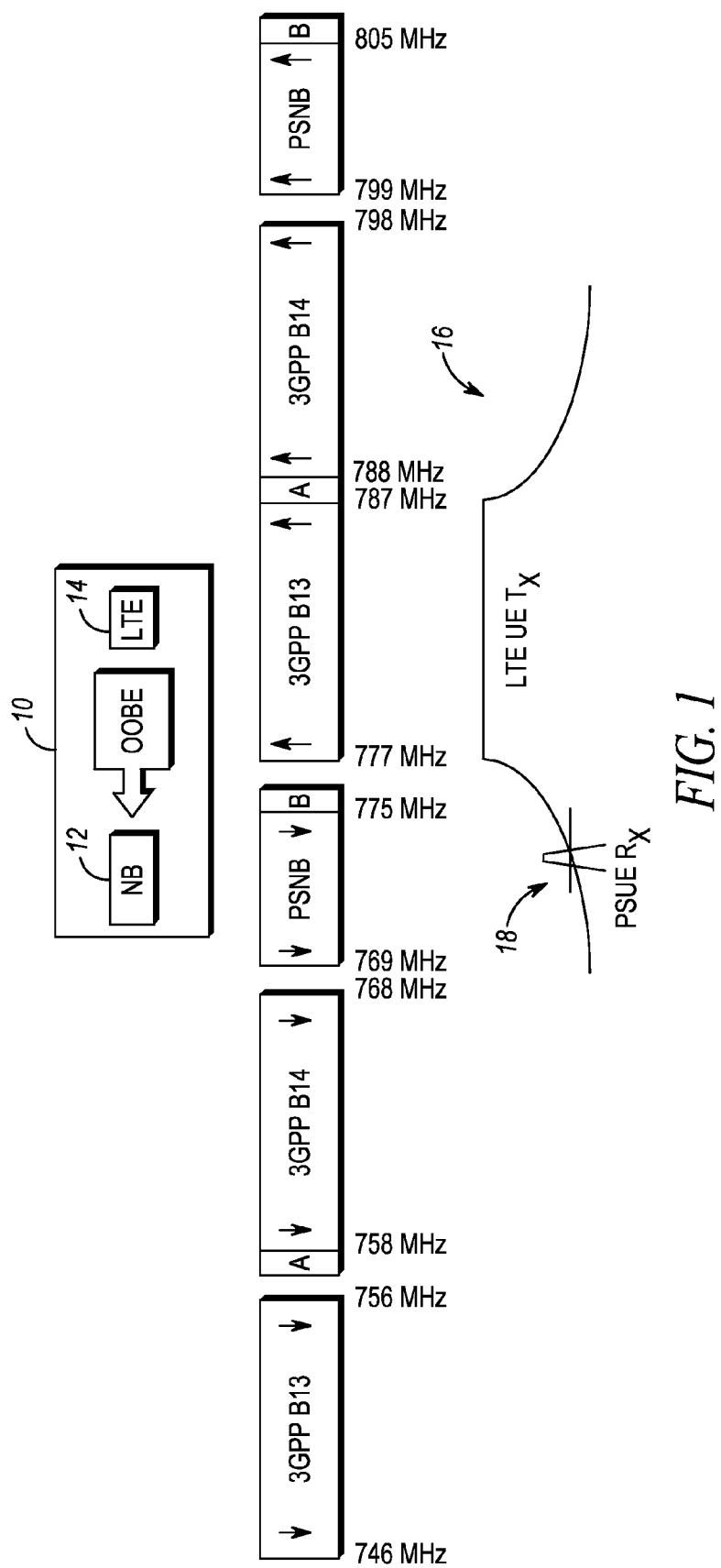
FIG. 1 is a spectral diagram of frequency allocation illustrating an exemplary interference scenario in a portable device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for DC offset correction in an adaptive correlation canceller for a dual mode communication device includes detecting an active signal transmitting in one mode; configuring integrators associated with the adaptive correlation canceller into gain amplifiers; detecting DC offset utilizing the gain amplifiers and comparators; and configuring the integrators from the gain amplifiers back to integrators with the DC offset applied thereto.

In another exemplary embodiment, a correlation canceller circuit with adaptive DC offset correction for a dual mode communication device includes an integrator section coupled to a reference signal from a first mode; a weighter section coupled to the integrator section and a summer coupled to a received signal from a second mode; wherein the integrator section is configured to selectively operate as integrators for adaptive correlation canceller and as gain amplifiers for detecting DC offsets in the adaptive correlation canceller, when the reference signal is active from the first mode.

In yet another exemplary embodiment, a dual mode communication device, wherein one mode is transmitting in an adjacent band as another mode is receiving, the dual mode communicative device includes a transmitter for a first mode; a receiver for a second mode which is substantially adjacent in spectrum to the first mode; and an adaptive correlation canceller circuit coupled to the transmitter and the receiver and configured to estimate phase and amplitude of signals from the first mode for subtraction from a received signal from the second mode, wherein the adaptive correlation canceller circuit comprises an integrator section coupled to a reference signal from the first mode and a weighter section coupled to the integrator section and a summer coupled to the received signal from the second mode; wherein the integrator section is configured to selectively operate as integrators for adaptive correlation canceller and as gain amplifiers for detecting DC offsets in the adaptive correlation canceller, when the reference signal is active from the first mode.

In various exemplary embodiments, a method and apparatus are described for correlation canceller for interference mitigation with adaptive DC offset cancellation. The method and apparatus provide accurate DC offset correction, which is crucial for achieving required LTE signal correction to mitigate interference with dual-mode portable devices, such as LTE/Land Mobile Radio (LMR) devices. Correlation cancellers are a form of adaptive canceller where adaptive weighting is done at Radio Frequency (RF), and adaptive weights are created using RF multipliers and an integrator. The method and apparatus described herein addresses DC offsets, one of the primary limitations to correction performance in correlation cancellers. The method and apparatus achieve high resolution DC correction in a correlation canceller by switching the integrators into gain stages in order to compensate for the integrators' DC offsets. Advantageously, the method and apparatus enable use of the correlation canceller in a portable device, which is a reduced implementation relative to a full adaptive canceller.

FIG. 1 is a spectral diagram of frequency allocation illustrating an exemplary interference scenario in a portable device 10. For example, the portable device 10 can include a narrowband (NB) transceiver 12 and an LTE transceiver 14. The portable device 10 can be a dual-mode, integrated, and portable radio. The spectral diagram of FIG. 1 illustrates frequency from 746 MHz to 805 MHz where between 746 MHz and 756 MHz is a downlink for LTE Band 13 (3GPP B13), between 758 MHz and 768 MHz is a downlink for LTE Band 14 (3GPP B14), between 769 MHz and 775 MHz is a downlink for PS NB, between 777 MHz and 787 MHz is an uplink for LTE Band 13 (3GPP B13), between 788 MHz and 798 MHz is an uplink for LTE Band 14 (3GPP B14), and finally between 799 MHz and 805 MHz is an uplink for PS NB. FIG. 1 includes a spectral plot of an LTE User Equipment (UE) transmitter 16 in the LTE Band 13 with associated out-of-band emissions (OOBE) affecting a spectral plot of a PS US receiver 18 in the PS NB downlink.

Figure 2:
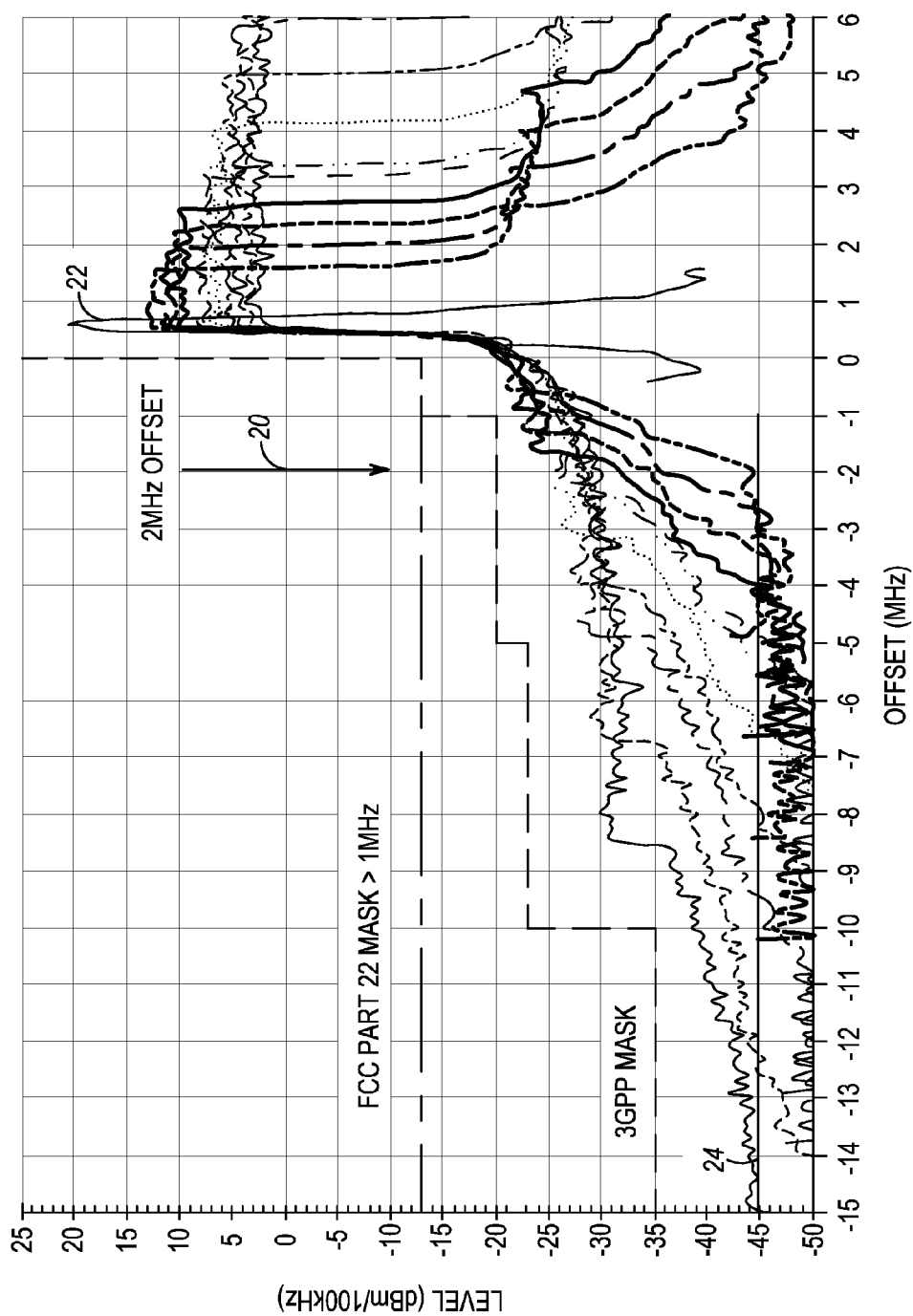
FIG. 2 is a graph of LTE-NB PS interference spectrum in accordance with some embodiments.

FIG. 2 is a graph of LTE-NB PS interference spectrum and shows example LTE spectrums for a variety of different resource block (RB) usage scenarios. The out-of-band-emissions (OOBE) of an LTE signal are dependent on the number, location and power of the resource blocks (RBs) the transmitter is using at any given time, and to a lesser extent on the modulator's noise floor. The narrowband Public Safety receive spectrum starts at the 2 MHz offset indicated by an arrow 20 in FIG. 2 and continues towards the lower frequency portion of the spectrum.

Several different masks for OOBE transmit power are included in the figure, the ones of most interest are the limit set by horizontal lines 22, 24. The horizontal line 22 corresponds to a worst case power level of −35 dBm/6.25 kHz, the current specification level that products are being designed to. The second one represented by the horizontal line 24 is the power allowed for either an integrated device, or when the standard 3GPP feature for adjacent channel power reduction known as NS_07 is enabled. This feature enables Additional Maximum Power Reduction or A-MPR. The principle of A-MPR is to restrict RB configuration (RB allocation, location and TX power) to further reduce OOBE. The cost of doing this is approximately 20% reduction in system throughput as well as additional scheduler complexity. The benefit is reduced OOBE, with A-MPR, the OOBE is reduced from −35 dBm/6.25 kHz to −57 dBm/6.25 kHz in the PS bands.

However, even this reduced level of OOBE is problematic for integrated NB/LTE Public Safety radios, therefore there is a need to provide more protection and it is also highly desirable to not have to sacrifice the system throughput for the additional OOBE reduction. Accordingly, the method and apparatus focuses on a correlation canceller to improve the OOBE performance. In addition to improving OOBE performance, the correlation canceller also will help receiver blocking as well. A reasonable target interference level to design for would be 6 dB below the typical receiver sensitivity level of −123 dBm. Assuming a broadband OOBE level of −57 dBm/6.25 kHz, this requires an interference cancellation amount to be greater than or equal to 60 dB.

Figure 3:
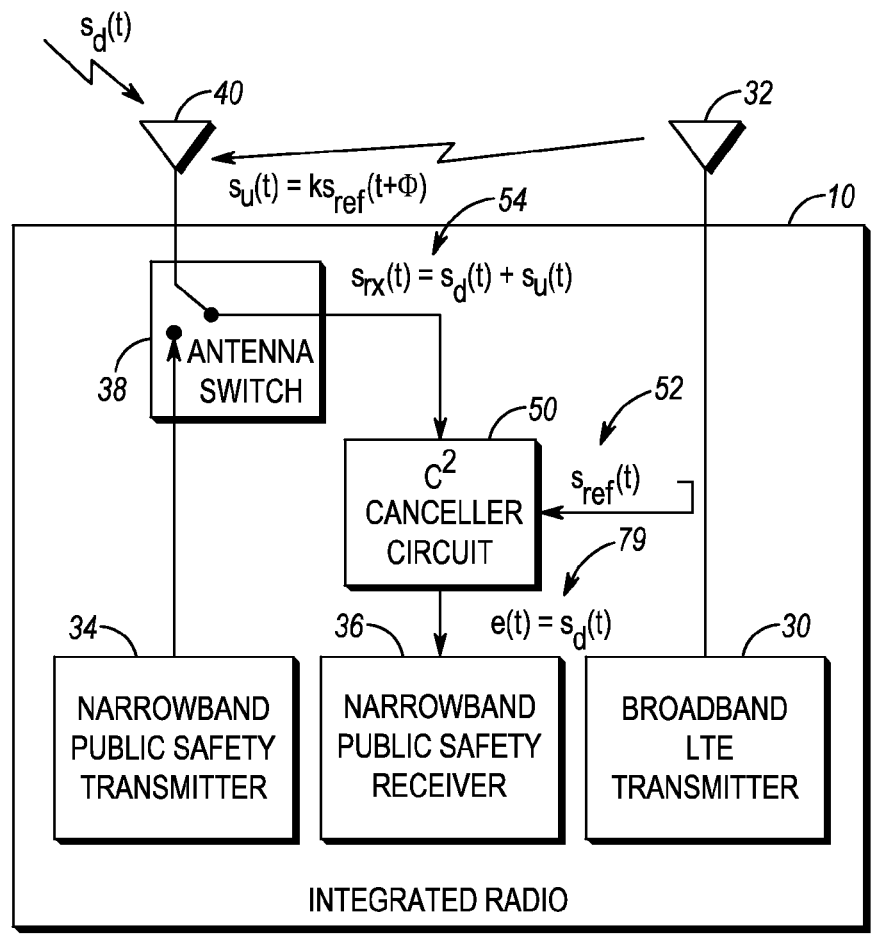
FIG. 3 is a block diagram of an integrated broadband and narrowband radio with correlation canceller for the portable device of FIG. 1 in accordance with some embodiments.

FIG. 3 is a block diagram of a correlation canceller for the portable device 10. Again, here, the portable device 10 is a dual-mode, integrated, and portable radio. FIG. 3 illustrates the components of interest for the correlation canceller in the portable device 10, and those of ordinary skill in the art will recognize other components associated with the portable device 10 are omitted for simplicity. The portable device 10 includes a broadband LTE transmitter 30 coupled to an antenna 32, a NB PS transmitter 34 and a ND PS receiver 36 coupled to an antenna switch 38 which selectively connects one of the NB PS transmitter 34 and the ND PS receiver 36 to an antenna 40, and a C2 canceller circuit 50 disposed between the antenna switch 38 and the antenna switch 38 and receiving an input from the antenna 32 for cancellation of associated interfering signals therefrom. The C2 canceller circuit 50 is configured to estimate the phase and amplitude of an interferer (e.g., an LTE signal) and subtract the interferer.

The C2 canceller circuit 50 is placed between the receiver side of the antenna switch 38 and the rest of the receiver circuitry in the ND PS receiver 36. The input on the narrowband side is the sum 54 of the desired narrowband signal $s_d(t)$ and the undesired broadband interference signal $s_u(t)$, which is a scaled and rotated version of the transmitted broadband signal $s_u(t)=k \cdot s_{ref}(t+\Phi)$, where k is an amplitude scaling factor and $s_{ref}(t+\Phi)$ is a reference signal, The output of the C2 canceller circuit 50 is the signal e(t), which when the C2 canceller circuit 50 has converged will be equal to the desired signal, with the C2 canceller circuit 50 "cancelling" out the undesired broadband interference portion of the received signal. An important point to make here is that one input to the C2 canceller circuit 50 is an exact copy of the broadband signal, this means that the job of the C2 canceller circuit 50 is simply to determine the values of the amplitude scaling and phase rotation that occur in the broadband received signal that is captured by the ND PS receiver 36. This also means that the bandwidth of the tracking loop only needs to be wide enough to track to changes in the channel coupling between the reference broadband signal and the received interference broadband signal not the broadband signal itself. This allows for a narrow loop bandwidth that minimizes noise coupled into the C2 canceller circuit 50.

Figure 4:
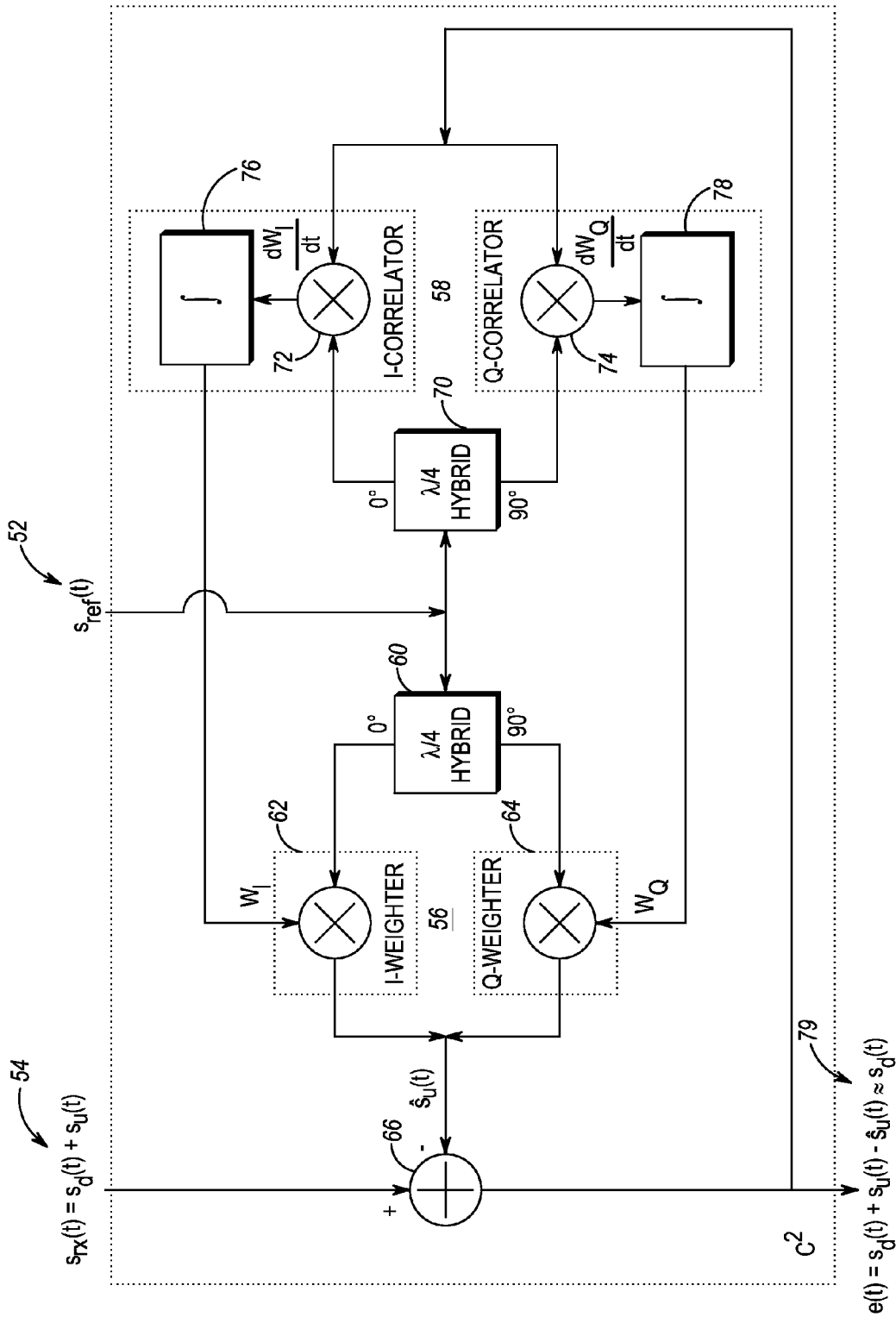
FIG. 4 is a block diagram of an exemplary implementation of the C2 canceller circuit in accordance with some embodiments.

FIG. 4 is a block diagram of an exemplary implementation of the C2 canceller circuit 50. The C2 canceller circuit 50 is an analog Least Mean Square (LMS) circuit where a LTE reference signal 52, $s_{ref}(t)$, is correlated with an LTE interferer. Based on this correlation, the phase and amplitude of the LTE reference signal 52 is changed to match the interferer phase and amplitude. This phase and amplitude shifted LTE interferer is subtracted from the input signal 54 ($s_{rx}(t)=s_d(t)+s_u(t)$).

The C2 canceller circuit 50 is made of two primary sections, a weighter section 56 and an integrator section 58. The weighter section 56 includes a hybrid splitter 60, two weighting mixers 62, 64, and a summer 66. The integrator section 58 includes a hybrid splitter 70, two mixers 72, 74, and two integrators 76, 78. The output of the integrators 76, 78 creates weighting factors used to both rotate and scale the reference signal 52 to match the undesired input signal.

Given the following inputs corresponding to the desired, undesired and reference signals:

$$s_d(t)=A_d \cos[\omega_c t+\theta_d(t)]$$

$$s_u(t)=A_u \cos[\omega_c t+\theta_u(t)]$$

$$s_{ref}(t)=A_{ref} \cos[\omega_c t+\theta_{ref}(t)]$$

where $A_d$ is the desired signal amplitude, $\omega_c$ is the carrier frequency, t is time, $\theta_d(t)$ is the desired signal phase, $A_u$ is the undesired signal amplitude, $\theta_u(t)$ is the undesired signal amplitude, $A_{ref}$ is the reference signal amplitude, and $\theta_{ref}(t)$ is the reference signal phase.

A fundamental assumption is that the undesired signal is just a scaled and rotated version of the reference signal 52 that only varies slowly with time, that is, $\Theta_u=\Theta_{ref}(t)+\Phi$ (phase shift) and $A_u=kA_{ref}$, therefore to show that the C2 canceller circuit 50 will remove the undesired broadband signal from the narrowband path it is sufficient to show that:

$$\hat{s}_u(t) \approx s_u(t) = A_u \cos[\omega_c t + \Theta_u(t)] = kA_{ref} \cos[\omega_c t + \Theta_{ref}(t) + \Phi]$$

where $\hat{s}_u(t)$ is the phase and amplitude shifter reference signal.

A detailed analysis of the C2 canceller circuit 50 can start with the integrator section 58 where since the interference signal $\Theta_{ref}(t)$ is uncorrelated with the desired signal $\Theta_d(t)$, the first term will integrate to zero so it can be dropped out, and further noting that $\Theta_u=\Theta_{ref}(t)+\Phi$ and $A_u=kA_{ref}$ and performing simplification, the algorithm will cancel out the interference in the steady state. That is, an output signal 79, e(t) will be:

$$e(t)=s_d(t)+s_u(t)-\hat{s}_u(t) \approx s_d(t).$$

Figure 5:
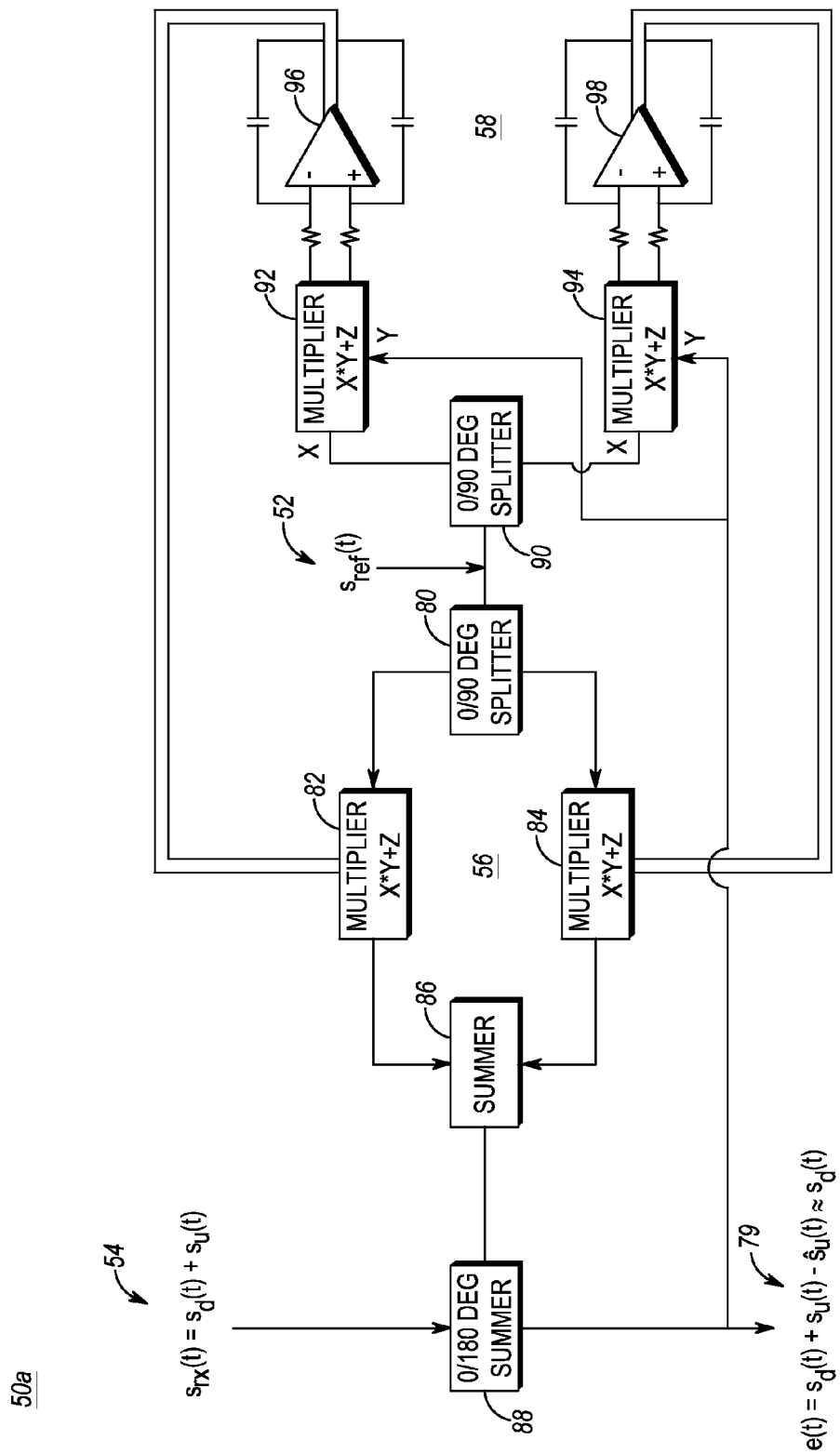
FIG. 5 is a circuit diagram of an exemplary implementation of the C2 canceller circuit in accordance with some embodiments.

FIG. 5 is a circuit diagram of an exemplary implementation of the C2 canceller circuit 50a. The C2canceller circuit 50a includes electrical circuit components realizing the C2 canceller circuit 50. Again, the C2 canceller circuit 50a includes the weighter section 56 and the integrator section 58. The weighter section 56 includes a 0/90 degree splitter 80, two multipliers 82, 84, a summer 86, and a 0/180 degree summer 88. The integrator section 58 includes a 0/90 degree splitter 90, two multipliers 92, 94, and two OpAmps 96, 98. Again, the output of the two OpAmps 96, 98 creates weighting factors used to both rotate and scale the reference signal 52 to match the undesired input signal.

Figure 6:
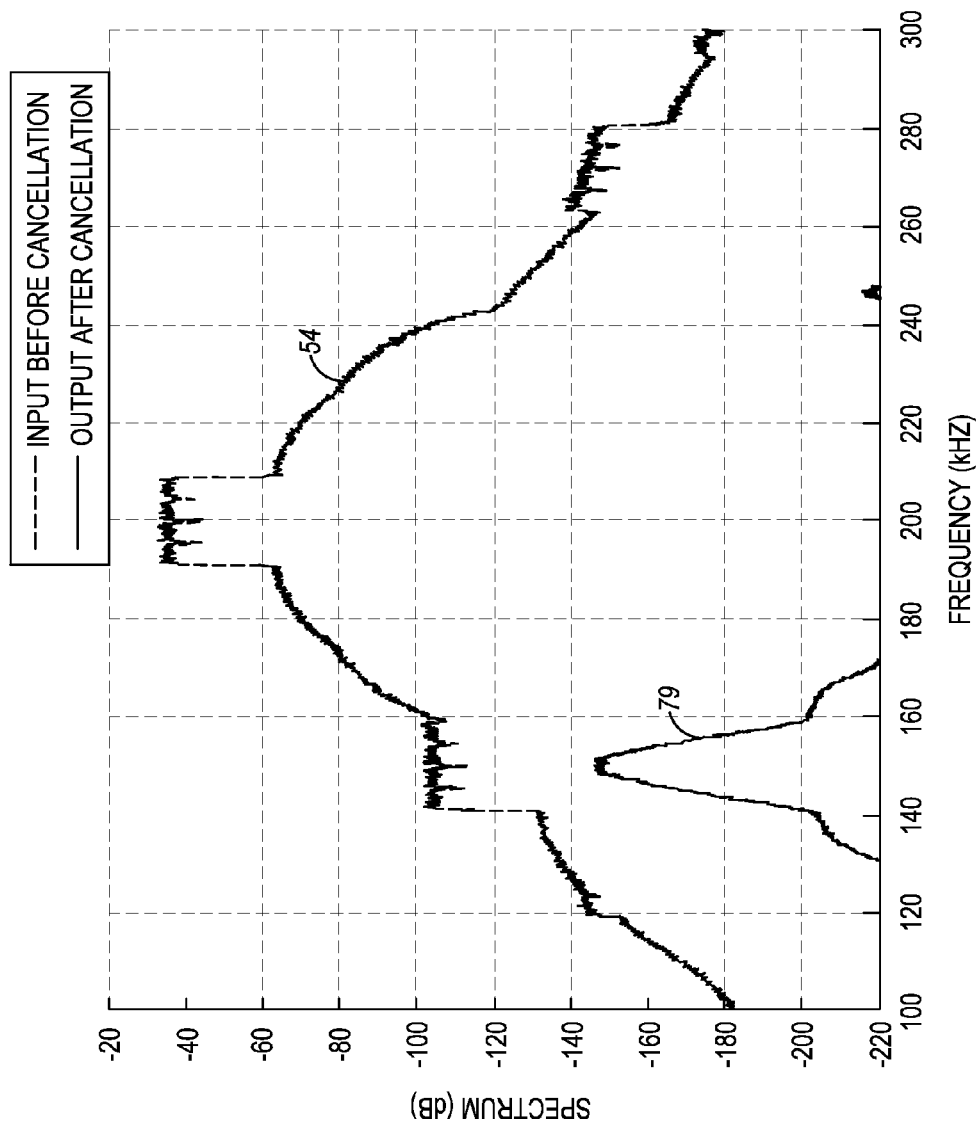
FIG. 6 is a graph of exemplary spectrum for the input signal and the output signal in the C2 canceller circuit of FIG. 5 in accordance with some embodiments.

FIG. 6 is a graph of exemplary spectrum for the input signal 54 and the output signal 79 in the C2canceller circuit 50a. The input signal 54 shows the received desired+undesired signal. Note that that the undesired signal completely swamps out the desired signal in this signal as can be seen by the lack of the narrowband spectrum at 150 kHz (which is the desired signal IF frequency). The output signal 79 shows the output of the C2 canceller circuit 50a, which clearly shows that the undesired signal has been significantly reduced, in this case the main portion of the interference signal offset by 50 kHz from the desired signal, has been reduced by >140 dB. Note that the portion of the interference close to the desired signal is also reduced, but by a smaller amount, more like ~90 dB.

Figure 7:
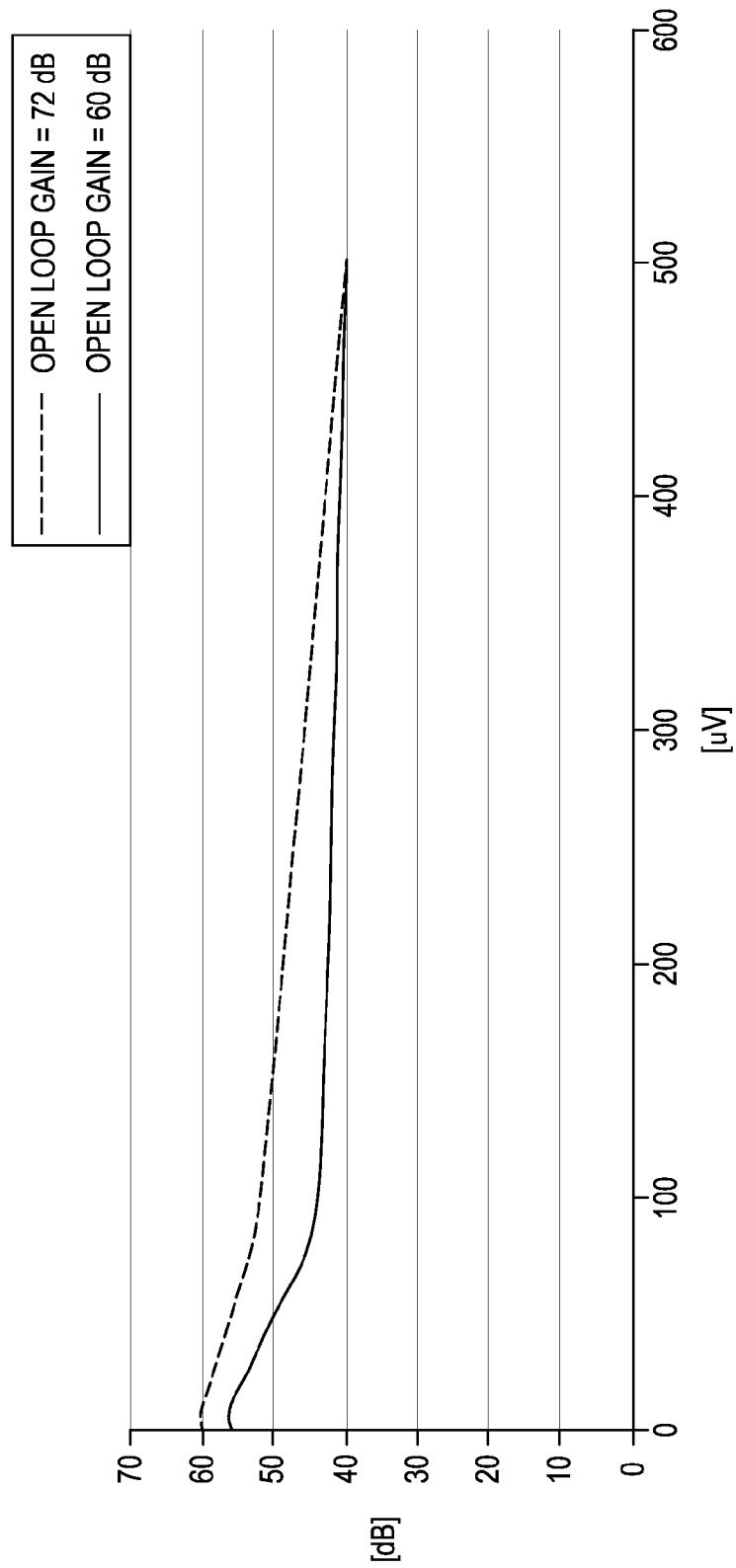
FIG. 7 is a graph of C2 canceller correction circuit versus DC offset at inputs to the integrators in accordance with some embodiments.

FIG. 7 is a graph of C2 canceller circuit 50 versus DC offset at inputs to the integrators 76, 78 (OpAmps 96, 98). In FIGS. 4 and 5, DC offset at inputs to the integrators 76, 78 (OpAmps 96, 98) is not being corrected. Simulations and measurements show that DC offset at the integrators inputs limit the C2 canceller circuit 50 performance. As shown in FIG. 7, to achieve 60 dB correction, this DC offset must be less than 20 µV. DC offset will change with temperature; so adaptive DC offset cancellation is needed in the C2 canceller circuit 50.

Figure 8:
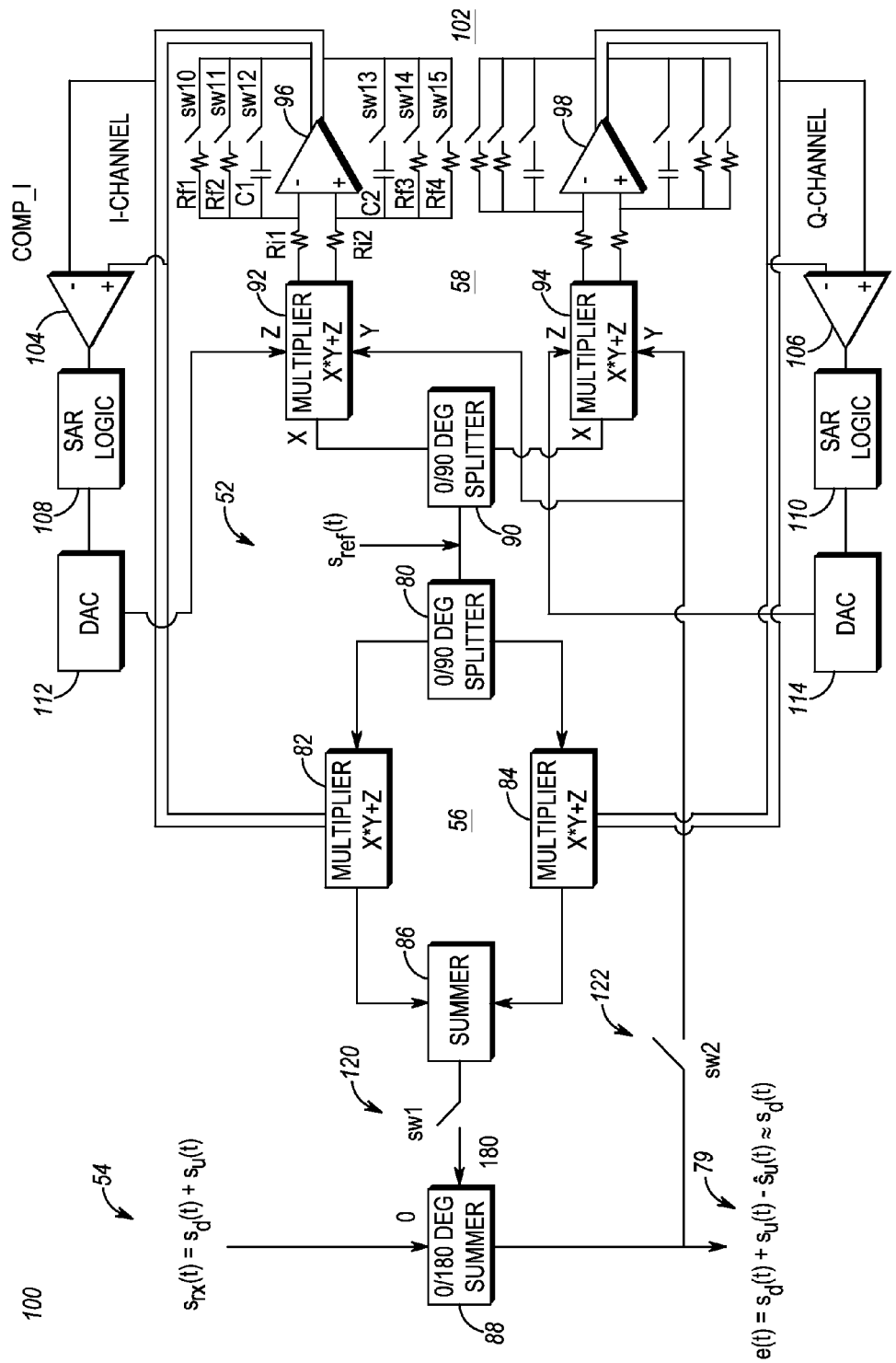
FIG. 8 is a circuit diagram of an exemplary implementation of a C2 canceller circuit with a DC offset correction loop in accordance with some embodiments.

FIG. 8 is a circuit diagram of an exemplary implementation of a C2 canceller 100 with a DC offset correction loop. The C2 canceller 100 utilizes portions of the C2 canceller circuit 50a and adds DC offset correction thereto. The C2 canceller 100 with adaptive mixed signal DC offset correction is suitable for discrete or Integrated Circuit (IC) implementation. Similar to the C2 canceller circuit 50, the C2 canceller 100 is configured to estimate the phase and amplitude of an interferer (e.g., an LTE signal) and subtract the interferer, but with improved performance because DC offset is corrected in the C2 canceller 100.

The DC offset correction loop in the C2 canceller 100 includes the C2 canceller main loop integrator configured as a gain stage 102 (i.e., the OpAmp 96, 98), low offset comparators 104, 106 (1 mV), logic 108, 110 (FPGA or custom IC digital) that implements a Successive Approximation Register (SAR) algorithm, low noise Digital-to-Analog Converters (DAC) 112, 114, and the multipliers 92, 94 with DC offset adjustment. The DC offset correction needs to compensate for DC offset with the multipliers 92, 94 and the integrators, so having the common OpAmps 96, 98 for both the main loop integrator and DC offset correction loop gain stage address this issue. In the gain stage 102, each of the OpAmp 96, 98 have resistors Rf1, Rf2, Rf3, Rf4 selectively connected based on switches sw10, sw11, sw14, sw15 and capacitors C1, C2 selectively connected based on switches sw12, sw13.

During DC offset correction, a main C2 loop is opened in the C2 canceller 100 so no output is provided, i.e. switches 120, 122 are opened, but the LTE reference signal 52 is applied to the C2 canceller 100. The main loop integrator is configured as the gain stage 102 with a gain x7 at the beginning of the SAR, and after the first 8 SAR steps, the gain is programmed to be 80. The higher gain is programmed to mitigate comparator DC offset of ~1 mV. The lower gain at first 8 SAR steps is used in order to keep high DC offset correction dynamic range. Close to final convergence 1 mV/80=12.5 µV DC offset compensation accuracy can be achieved.

To get accurate DC offset correction, the DC offset correction loop must be done with the LTE reference signal 52 present. In an LTE Uplink (UL) transmitter, the Tx duration comes in units of 0.5 ms known as slots. The DC offset correction can be triggered just after the beginning of an LTE slot. The beginning of the LTE slot can be detected by sampling a LTE Radio Frequency Power Amplifier (RFPA) enable signal.

Again, the DC offset correction loop operates by disconnecting the C2 canceller 100 from the output signal 79, while the LTE reference signal 52 is applied. The DC offset correction loop provides mixed signal DC offset corrections for C2 canceller 100 with the main correction loop integrators during DC offset training reconfigured into gain stages as part of DC offset loop. This way the integrator OpAmps 96, 98 internal offset is also being compensated. Using separate OpAmps as a gain stage for DC offset loop gives un-satisfactory performance because it will have its own DC offset that is not correlated to integrator OpAmps 96, 98 DC offset.

The DC offset correction loop is a process using the C2 canceller 100 as an adaptive correlation canceller for a dual mode communication device where one of the two communication modems transmits in an adjacent band to the receiver of the second modem. The DC offset correction loop generally includes detection of an active LTE signal, starting the loop while the LTE signal is active, converting I/Q integrators into low gain amplifiers (operating in a low gain mode), activating first steps of a SAR to correct for coarse DC offsets, converting low gain amplifier to high gain amplifiers (operating in a high gain mode), activating final steps of the SAR to correct fine DC offsets, saving DC offset values, and converting I/Q amplifiers back to integrators and closing the main loop.

Figure 9:
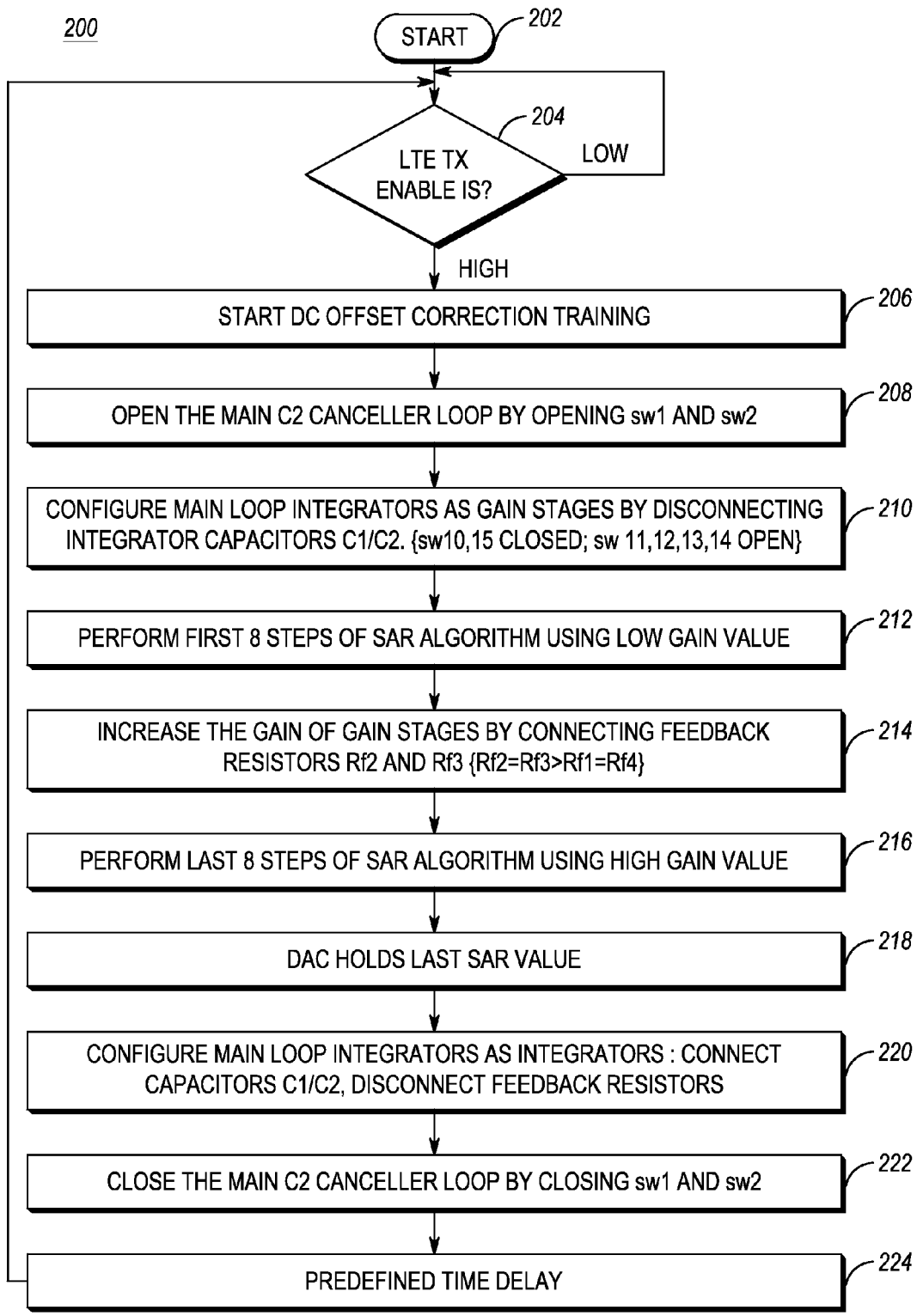
FIG. 9 is a flow chart of a DC offset correction loop with reference to the I-channel of the C2 canceller in accordance with some embodiments.

FIG. 9 is a flow chart of a DC offset correction loop 200 with reference to the I-channel of the C2 canceller 100 (i.e., the multiplier 92, the OpAmp 96, the comparator 104, the logic 108, and the DAC 112). Note, the loop 200 is also applicable to the Q-channel as well. The DC offset correction loop 200 starts (step 202) and includes waiting until the LTE TX enable is high (step 204), i.e. that the LTE signal is active. The DC offset correction loop 200 includes starting offset correction training (step 206) and opening the main C2 canceller loop by opening the switches 120, 122 (step 208).

The DC offset correction loop 200 includes configuring the main loop integrators as gain stages by disconnecting the integrator capacitors C1, C2, i.e. switches sw10, sw15 are closed and switches sw11, sw12, sw13, sw14 are open (step 210), and the first 8 steps of the SAR algorithm are performed (step 212). Next, the gain of the gain stages is increased by connecting feedback resistors Rf2, Rf3 (e.g., Rf2=Rf3>Rf1=Rf4) (step 214), and performs the last 8 steps of the SAR algorithm (step 216). When complete with the SAR algorithm, the DAC 112 holds the last SAR value (step 218), and the main loop integrators are again configured as integrators by connecting the capacitors C1, C2 and disconnecting the feedback resistors (step 220). Finally, the main C2 canceller loop is closed by closing the switches 120, 122 (step 222). The DC offset correction loop 200 can be implemented again after a periodic time delay (step 224).

The SAR algorithm objective is to estimate accurately the DC offset error associated with the detection mixer and canceller loop integrator. The algorithm is an iterative process implemented using digital circuits (FPGA or processor) by applying 16 bits word to a 16 bit DAC. The convergence process includes 16 iterations. In the first iteration the algorithm will set DAC Most Significant Bit (MSB) to "1"m and all the other bits to 0. This will set the DAC analog value to the middle of the range. If the input bit to the SAR is "1", it implies that the estimated DC value is higher than the desired DC error value, and the MSB bit is set to "0". If the input to the SAR is "0", it is implying that SAR estimated value is lower than the desired DC error value, and the MSB bit is kept at "1". The next iteration of SAR algorithm will set (MSB-1) bit of the DAC. Again, if the input to SAR is "0" then (MSB-1) bit of the DAC is set to 1; otherwise (MSB-1) bit of the DAC is set to 1. The SAR algorithm sets all 16 bits of the DAC in a similar fashion. The DC offset algorithm loop includes a comparator. The comparator has an associated internal DC offset voltage that can degrade the ability of the algorithm to converge to an accurate value. A typical comparator DC offset is ~+/−1 mV. The comparator DC offset can be mitigated by increasing the gain of amplifier before the comparator. In the first few iterations of the DC offset algorithm the DC offset error is quite large and increasing the loop amplifier gain can limit convergence range. A solution in the method and apparatus described herein is to use low gain value in the first 8 steps in order to avoid converge issue (i.e., a low gain mode). Then in the last 8 iterations to use high amplifier gain in order to establish the final DC offset accuracy by overcome the comparator DC offset issue (i.e., a high gain mode). Other embodiments are also contemplated.

The comparator 104, 106 in the DC offset loop also has non-zero DC offset. Its DC offset is being mitigated as following: at the beginning of the SAR algorithm, the gain stage before the comparator is configured to allow needed DC offset correction range. After 8 SAR steps, the gain is increased to reduce comparator DC offset contribution (as shown in step 214 in the DC offset correction loop 200). That is, there is a low gain initially for the SAR DC to correct a large DC offset from the comparator, then high gain to compensate for other small DC offset contributions.

Figure 10:
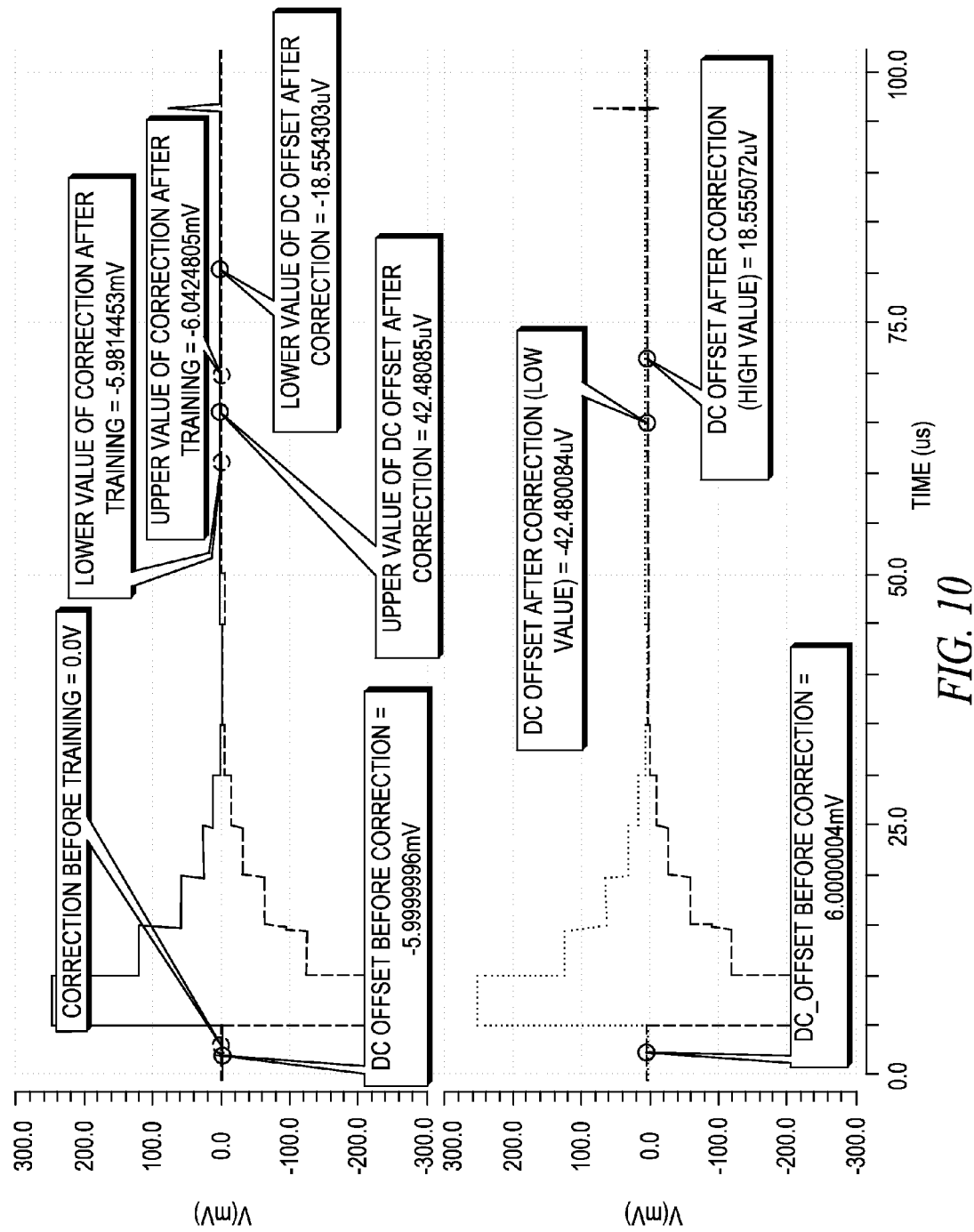
FIG. 10 is a graph showing the DC offset correction loop of FIG. 9 converging to the correct value in accordance with some embodiments.

FIG. 10 is a graph showing the DC offset correction loop 200 converging to the correct value. Here, the LTE reference signal 52 is a 5 MHz LTE signal. The convergence is within 100 μs and provides a DC offset accuracy of ±10 μV.

Figure 11:
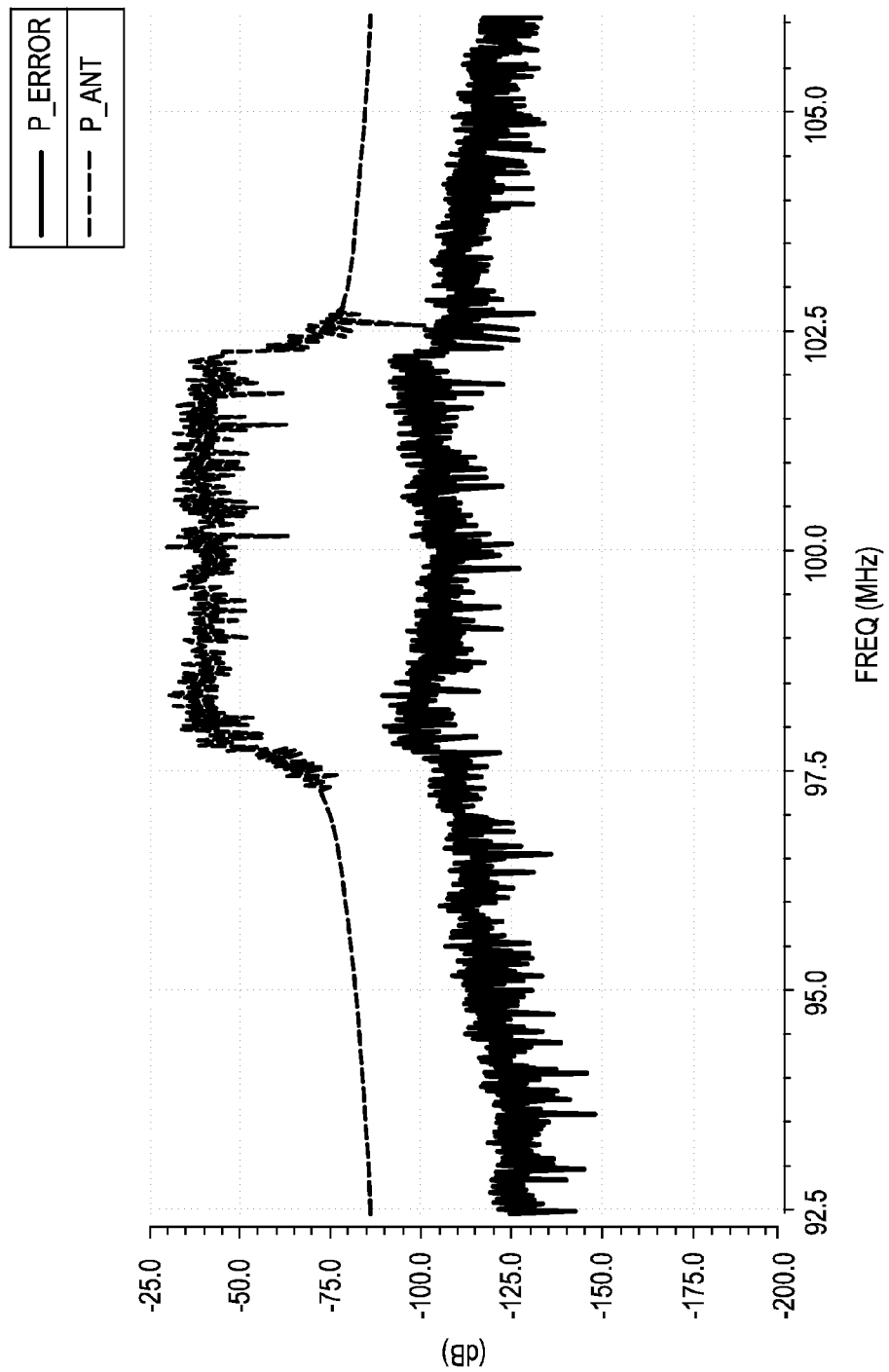
FIG. 11 is a graph showing C2 correction for the 5 MHz LTE signal (FIG. 10) after the DC offset correction loop in accordance with some embodiments.

FIG. 11 is a graph showing C2 correction for the 5 MHz LTE signal (FIG. 10) after the DC offset correction loop 200. FIG. 11 shows approximately 60 dB of correction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for direct current (DC) offset correction in an adaptive correlation canceller for a dual mode communication device, the method comprising:
   detecting an active signal transmitting in one mode;
   configuring integrators associated with the adaptive correlation canceller into gain amplifiers;
   detecting DC offset utilizing the gain amplifiers and comparators; and
   configuring the integrators from the gain amplifiers back to integrators with the DC offset applied thereto; and
   wherein the adaptive correlation canceller estimates phase and amplitude of the active signal to subtract from a signal received in another mode which is adjacent to the active signal.

2. The method of claim 1, wherein the active signal transmitting in one mode is Long Term Evolution which is adjacent to a signal in another mode.

3. The method of claim 1, wherein the DC offset is detected and corrected for multipliers and the integrators using a common OpAmp.

4. The method of claim 1, wherein the detecting the active signal is based on sampling a Long Term Evolution (LTE) Radio Frequency Power Amplifier (RFPA) enable signal.

5. A method for direct current (DC) offset correction in an adaptive correlation canceller for a dual mode communication device, the method comprising:
   detecting an active signal transmitting in one mode;
   configuring integrators associated with the adaptive correlation canceller into gain amplifiers, wherein the integrators are configured into the gain amplifiers through selectively disconnecting the adaptive correlation canceller from a received signal and an output signal generated by the integrators and selectively adjusting circuitry associated with the integrators;
   detecting DC offset utilizing the gain amplifiers and comparators;
   configuring the integrators from the gain amplifiers back to integrators with the DC offset applied thereto;
   receiving a reference signal from the one mode;
   receiving a received signal from another mode; and
   providing an output signal from the received signal with interference from the one mode removed by the adaptive correlation canceller, with the integrators with the DC offset applied thereto.

6. A method for direct current (DC) offset correction in an adaptive correlation canceller for a dual mode communication device, the method comprising:
   detecting an active signal transmitting in one mode;
   configuring integrators associated with the adaptive correlation canceller into gain amplifiers, wherein the gain amplifiers are configured in a low gain stage for coarse DC offset detection and a high gain stage for fine DC offset detection;
   wherein the integrators are configured into the gain amplifiers through selectively disconnecting the adaptive correlation canceller from a received signal and an output signal generated by the integrators;
   detecting DC offset utilizing the gain amplifiers and comparators; and
   configuring the integrators from the gain amplifiers back to integrators with the DC offset applied thereto.

7. The method of claim 6, wherein the DC offset is detected using a Successive Approximation Register (SAR) algorithm.

8. A correlation canceller circuit with adaptive direct current (DC) offset correction for a dual mode communication device, the correlation canceller circuit comprising:
   an integrator section coupled to a reference signal from a first mode;
   a weighter section coupled to the integrator section and a summer coupled to a received signal from a second mode;
   wherein the integrator section is configured to selectively operate as integrators for adaptive correlation canceller and as gain amplifiers for detecting DC offsets in the adaptive correlation canceller, when the reference signal is active from the first mode; and
   wherein the adaptive correlation canceller estimates phase and amplitude of signals from the first mode to subtract from the received signal from the second mode, the received signal being adjacent from the signals from the first mode.

9. The correlation canceller circuit of claim 8, wherein the reference signal from the first mode is Long Term Evolution which is adjacent to the received signal in the second mode.

10. The correlation canceller circuit of claim 8, wherein the DC offset is detected using a Successive Approximation Register (SAR) algorithm.

11. The correlation canceller circuit of claim 8, wherein the DC offset is detected and corrected for multipliers and the integrators using a common OpAmp.

12. The correlation canceller circuit of claim 8, wherein the reference signal is detected as active based on sampling a Long Term Evolution (LTE) Radio Frequency Power Amplifier (RFPA) enable signal.

13. A correlation canceller circuit with adaptive direct current (DC) offset correction for a dual mode communication device, the correlation canceller circuit comprising:
   an integrator section coupled to a reference signal from a first mode;
   a weighter section coupled to the integrator section and a summer coupled to a received signal from a second mode; and
   wherein the integrator section is configured to selectively operate as integrators for adaptive correlation canceller and as gain amplifiers for detecting DC offsets in the adaptive correlation canceller, when the reference signal is active from the first mode; and wherein integrators associated with the integrator section are configured into the gain amplifiers through selectively disconnecting the weighter section from the summer and disconnecting the correlation canceller circuit from a received signal and selectively adjusting circuitry associated with the integrators.

14. A correlation canceller circuit with adaptive direct current (DC) offset correction for a dual mode communication device, the correlation canceller circuit comprising:

an integrator section coupled to a reference signal from a first mode;

a weighter section coupled to the integrator section and a summer coupled to a received signal from a second mode; and wherein the integrator section is configured to selectively operate as integrators for adaptive correlation canceller and as gain amplifiers for detecting DC offsets in the adaptive correlation canceller by selectively disconnecting the weighter section from the summer and by disconnecting the correlation canceller circuit from a received signal, when the reference signal is active from the first mode; and wherein the gain amplifiers are configured in a low gain stage for coarse DC offset detection and a high gain stage for fine DC offset detection.

15. A dual mode communication device, wherein one mode is transmitting in an adjacent band as another mode is receiving, the dual mode communication device comprising:

a transmitter for a first mode;

a receiver for a second mode which is substantially adjacent in spectrum to the first mode, wherein the first mode is Long Term Evolution and the second mode is narrowband Public Safety; and an adaptive correlation canceller circuit coupled to the transmitter and the receiver and configured to estimate phase and amplitude of signals from the first mode to subtract from a received signal from the second mode, wherein the adaptive correlation canceller circuit comprises an integrator section coupled to a reference signal from the first mode and a weighter section coupled to the integrator section and a summer coupled to the received signal from the second mode;

wherein the integrator section is configured to selectively operate as integrators for adaptive correlation canceller and as gain amplifiers for detecting direct current (DC) offsets in the adaptive correlation canceller, when the reference signal is active from the first mode.

16. A dual mode communication device, wherein one mode is transmitting in an adjacent band as another mode is receiving, the dual mode communication device comprising:

a transmitter for a first mode;

a receiver for a second mode which is substantially adjacent in spectrum to the first mode;

an adaptive correlation canceller circuit coupled to the transmitter and the receiver and configured to estimate phase and amplitude of signals from the first mode to subtract from a received signal from the second mode, wherein the adaptive correlation canceller circuit comprises an integrator section coupled to a reference signal from the first mode and a weighter section coupled to the integrator section and a summer coupled to the received signal from the second mode;

wherein the integrator section is configured to selectively operate as integrators for adaptive correlation canceller and as gain amplifiers for detecting direct current (DC) offsets in the adaptive correlation canceller, when the reference signal is active from the first mode; and wherein integrators associated with the integrator section are configured into the gain amplifiers through selectively disconnecting the weighter section from the summer and disconnecting the adaptive correlation canceller from an output signal of the summer and selectively adjusting circuitry associated with the integrators.

* * * * *